US010769662B2

(12) United States Patent
Narravula et al.

(10) Patent No.: US 10,769,662 B2
(45) Date of Patent: Sep. 8, 2020

(54) CONTENT SELECTION

(71) Applicant: Yahoo!, Inc., Sunnyvale, CA (US)

(72) Inventors: Sundeep Narravula, Sunnyvale, CA (US); Sudhir Chauhan, Sunnyvale, CA (US); Kshitiz Tripathi, San Jose, CA (US)

(73) Assignee: Oath Inc., New York, NY (US)

( * ) Notice: Subject to any disclaimer, the term of this patent is extended or adjusted under 35 U.S.C. 154(b) by 898 days.

(21) Appl. No.: 14/832,115

(22) Filed: Aug. 21, 2015

(65) Prior Publication Data

US 2017/0053313 A1   Feb. 23, 2017

(51) Int. Cl.
*G06Q 30/02*   (2012.01)

(52) U.S. Cl.
CPC ..... *G06Q 30/0256* (2013.01); *G06Q 30/0275* (2013.01)

(58) Field of Classification Search
CPC ................. G06Q 30/0256; G06Q 30/0275
See application file for complete search history.

(56) References Cited

U.S. PATENT DOCUMENTS

2011/0288928 A1 *  11/2011  Patwa ............... G06Q 30/0256
                                                                  705/14.42

OTHER PUBLICATIONS

"Multi-Object Auctions with Package Bidding: An Experimental Comparison of Vickrey and iBEA", by Chen et al. May 1, 2008. (Year: 2008).*
"Keyword Management Costs and "Broad Match" in Sponsored Search Advertising", by Amaldoss et al. Working Paper. Jun. 2014. (Year: 2014).*

* cited by examiner

*Primary Examiner* — William A Brandenburg
(74) *Attorney, Agent, or Firm* — Cooper Legal Group, LLC (57) ABSTRACT

As provided herein, a primary content provider (e.g., a book retailer) may present a campaign for a product (e.g., a novel), comprising non-published content and a keyword (e.g., the novel title), to a permitted content provider (e.g., the publisher of the novel). The permitted content provider may be presented with an option to bid on the keyword. Responsive to the bid being accepted by the primary content provider, a cumulative bid is determined based upon an accumulation of an existing bid from the primary content provider and the bid. The non-published content, but not second non-published content of a second primary content provider, may be selected to be provided to a user based upon the cumulative bid exceeding a second bid for the keyword by the second primary content provider. In this way, content that may be relevant to the user may be identified and provided to the user.

20 Claims, 10 Drawing Sheets

CONTENT SELECTION

BACKGROUND

Content, associated with a content provider, may be presented to users based upon the users performing keyword searches using a keyword associated with the content. For example, a seller of a shoe brand (e.g., a basketball shoe) may generate content, displaying attributes of the shoe brand, to present to the users. The content provider may bid on a keyword (e.g., shoe, athletic shoe, basketball shoe, and/or other keywords), such that if the content provider wins the bid, then the content may be displayed to the users that submit search queries corresponding to the keyword. There may be other entities, such as a second content provider, that may have an interest and/or stake in the users purchasing the shoe brand, such as a manufacturer of the shoe brand. Thus, the second content provider may bid on the keyword. Unfortunately, the content provider and the second content provider may be bidding against one another and thus increasing a price of the keyword even though both the content provider and the second content provider may benefit from the keyword being associated with the content for presentation of the content to the users.

SUMMARY

In accordance with the present disclosure, one or more systems and/or methods for content selection are provided. In an example, a primary content provider may be identified. The primary content provider may be associated with non-published content, comprising content that has not been published, comprised in a campaign for a product. The non-published content and a keyword associated with the non-published content may be presented to a permitted content provider identified by the primary content provider. An option may be presented to the permitted content provider to provide a bid to purchase the keyword. The bid may be received by the permitted content provider. Responsive to the primary content provider accepting the bid, a cumulative bid may be determined. The cumulative bid may be based upon the bid and an existing bid from the primary content provider. The non-published content may be selected, but not second content of a second primary content provider, to be provided to a user based upon the cumulative bid exceeding a second bid for the keyword by the second primary content provider. In this way, the primary content provider may collaborate with other content providers to generate an increased cumulative bid for winning an opportunity to purchase the keyword (e.g., an electronics store and a television manufacturer may submit a cumulative bid where both the electronics store and the television manufacturer contribute to the cost of the cumulative bid).

An option to alter a targeting attribute may be presented to the permitted content provider. The permitted content provider may generate a proposed targeting attribute of the campaign. The proposed targeting attribute may be received by the permitted content provider. Responsive to the primary content provider accepting the proposed targeting attribute, the targeting attribute may be altered to comprise the proposed targeting attribute (e.g., a domain, a topic group, an age group of users, a gender group of users, a category of users, etc.). For example, the proposed target group may comprise men between 25 years old and 35 years old. The non-published content may be selected to be provided to the user in the proposed target group (e.g., a 35 year old man).

An option to alter the content, by generating proposed content, may be presented to the permitted content provider. The proposed content may be received by the primary content provider from the permitted content provider. Responsive to the primary content provider accepting the proposed content, the campaign may be altered to comprise the proposed content (e.g., a videogame system advertisement). The second non-published content may be selected to be provided to the user, based upon the cumulative bid (e.g., for the campaign), exceeding the second bid.

An option to alter the keyword, by generating a proposed keyword, may be presented to the permitted content provider. The proposed keyword (e.g., a proposed keyword of "4k" for a keyword of "television") may be received by the primary content provider from the permitted content provider. Responsive to the primary content provider accepting the proposed keyword, the keyword may be altered to comprise the proposed keyword. The non-published content may be selected to be provided to the user, based upon the cumulative bid (e.g., for the proposed keyword), exceeding the second bid.

Published content, comprising the non-published content having been presented to a public, and the keyword associated with the published content may be presented to a non-permitted content provider identified by the primary content provider. An option may be presented, to the non-permitted content provider, to provide a non-permitted bid to purchase the keyword. The non-permitted bid may be received by the primary content provider from the non-permitted content provider. Responsive to the primary content provider accepting the non-permitted bid, a non-permitted cumulative bid may be determined based upon the non-permitted bid and the existing bid from the primary content provider.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
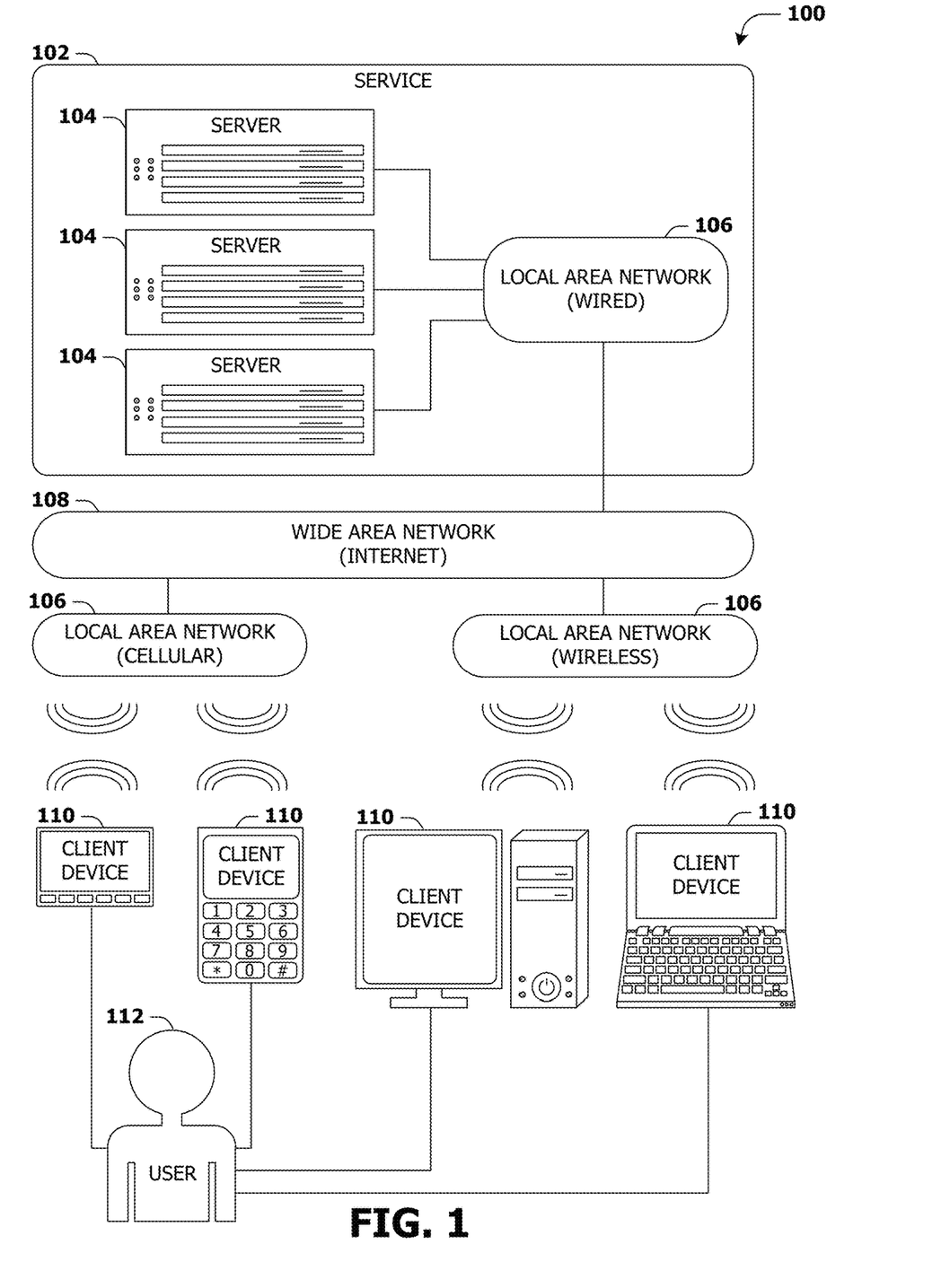
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
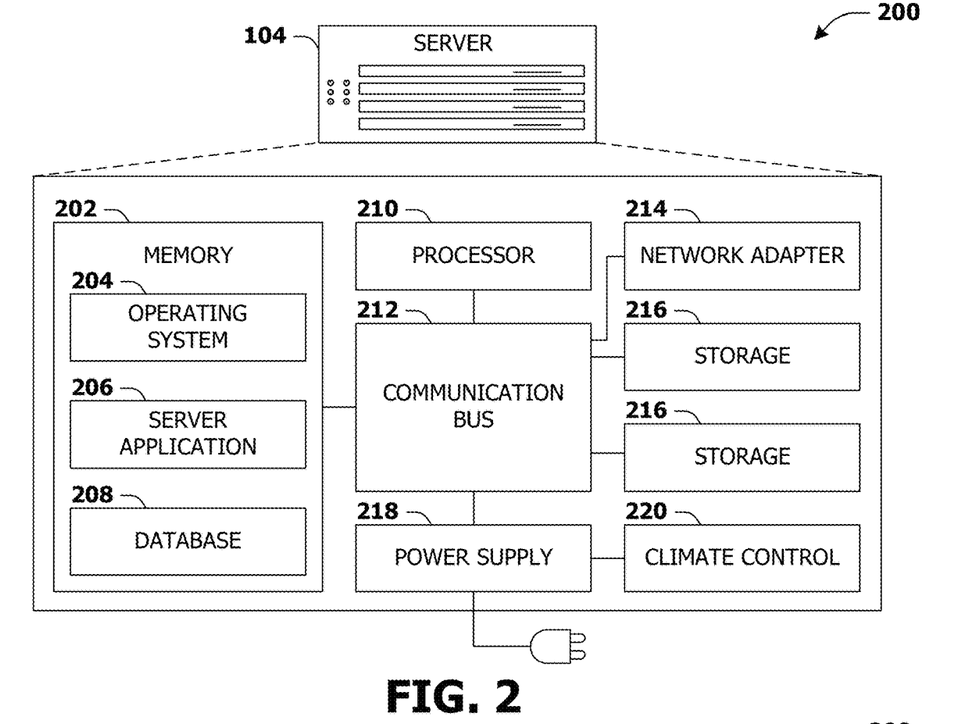
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
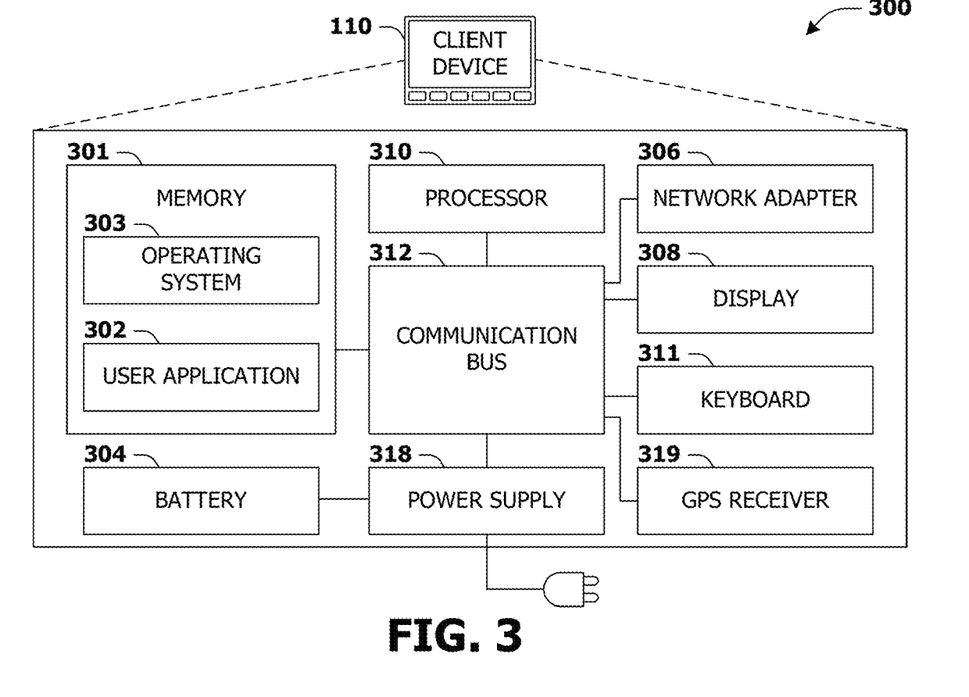
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals.

For example, a locally installed webserver may provide web content in response to locally submitted web requests. Many such client devices 110 may be configured and/or adapted to utilize at least a portion of the techniques presented herein.

2. Presented Techniques

One or more systems and/or techniques for content selection are provided. A primary content provider (e.g., a retail store) may offer a product (e.g., Basketball Player John shoes). The primary content provider may offer a bid for a keyword related to the Famous Basketball Player shoes (e.g., a name of Basketball Player John). A content provider may be a manufacturer of the Basketball Player John shoes. Basketball Player John may be paid a portion of sales of the Basketball Player John shoes. Basketball Player John and the content provider may augment the primary content providers bid to generate a cumulative bid, such that both Basketball Player John and the content provider may contribute to a cost of the cumulative bid. The primary content provider may generate a campaign comprising content associated with the product (e.g., a video, an image, a sound clip, text, etc.) and/or the keyword. A second primary content provider may generate a second campaign comprising second content associated with a second product (e.g., Basketball Player Tim). The second primary content provider may generate a second bid for the keyword. The content, but not the second content, may be presented to a user based upon the cumulative bid exceeding the second bid. Content providers may bid on a keyword associated with a product when users are likely to purchase the product (e.g., the content is relevant to the user). The ability to select content based upon increased bidding power of multiple entities having a stake in the content being provided to the users (e.g., the cumulative bid contributed to by both Basketball Player John and the manufacturer), may result in providing users with relevant content that may reduce power consumption and bandwidth otherwise wasted by users attempting to find such content.

Figure 4A:
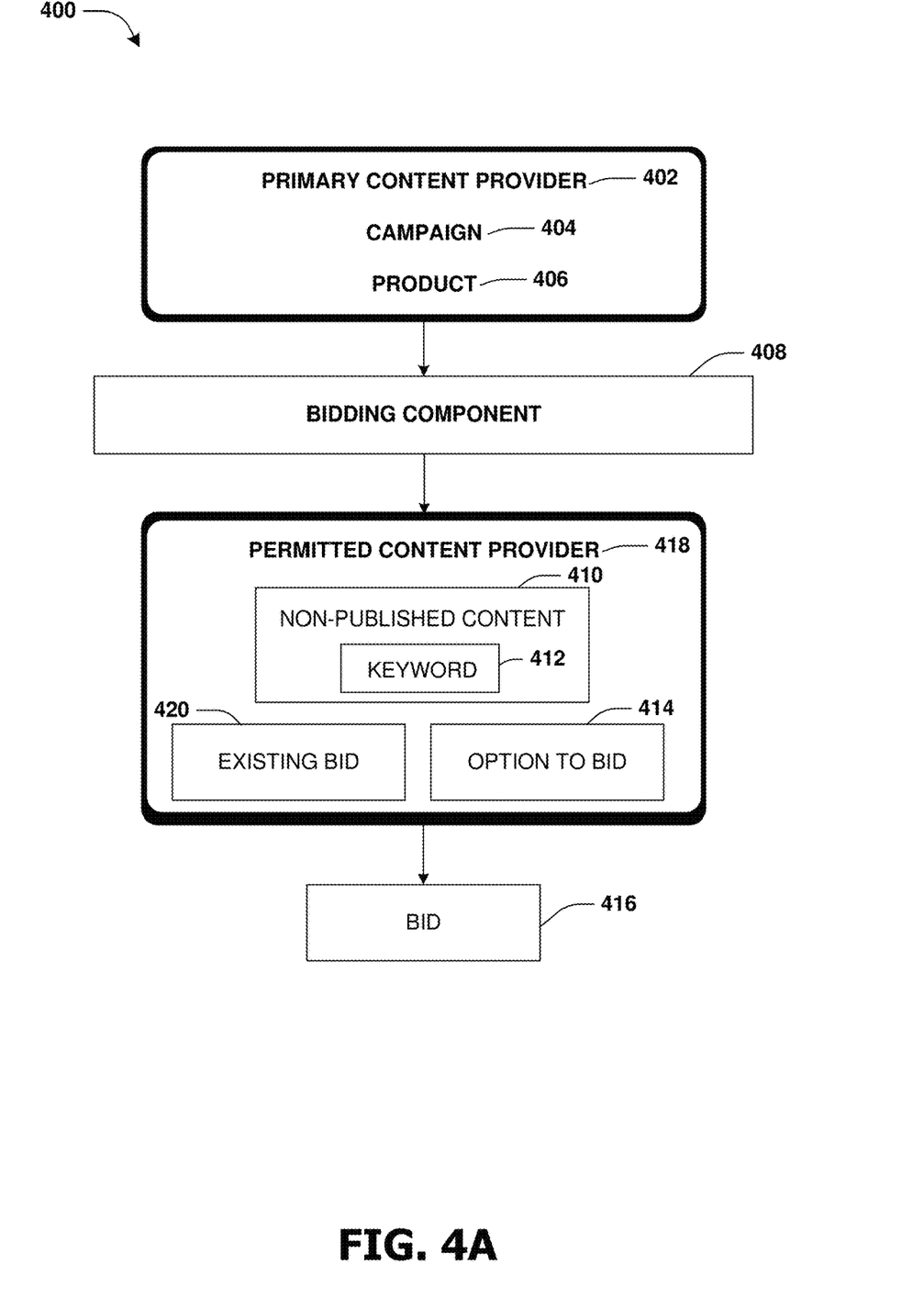
FIG. 4A is a component block diagram illustrating an example system for content identification, where a bid is generated.
Figure 4B:
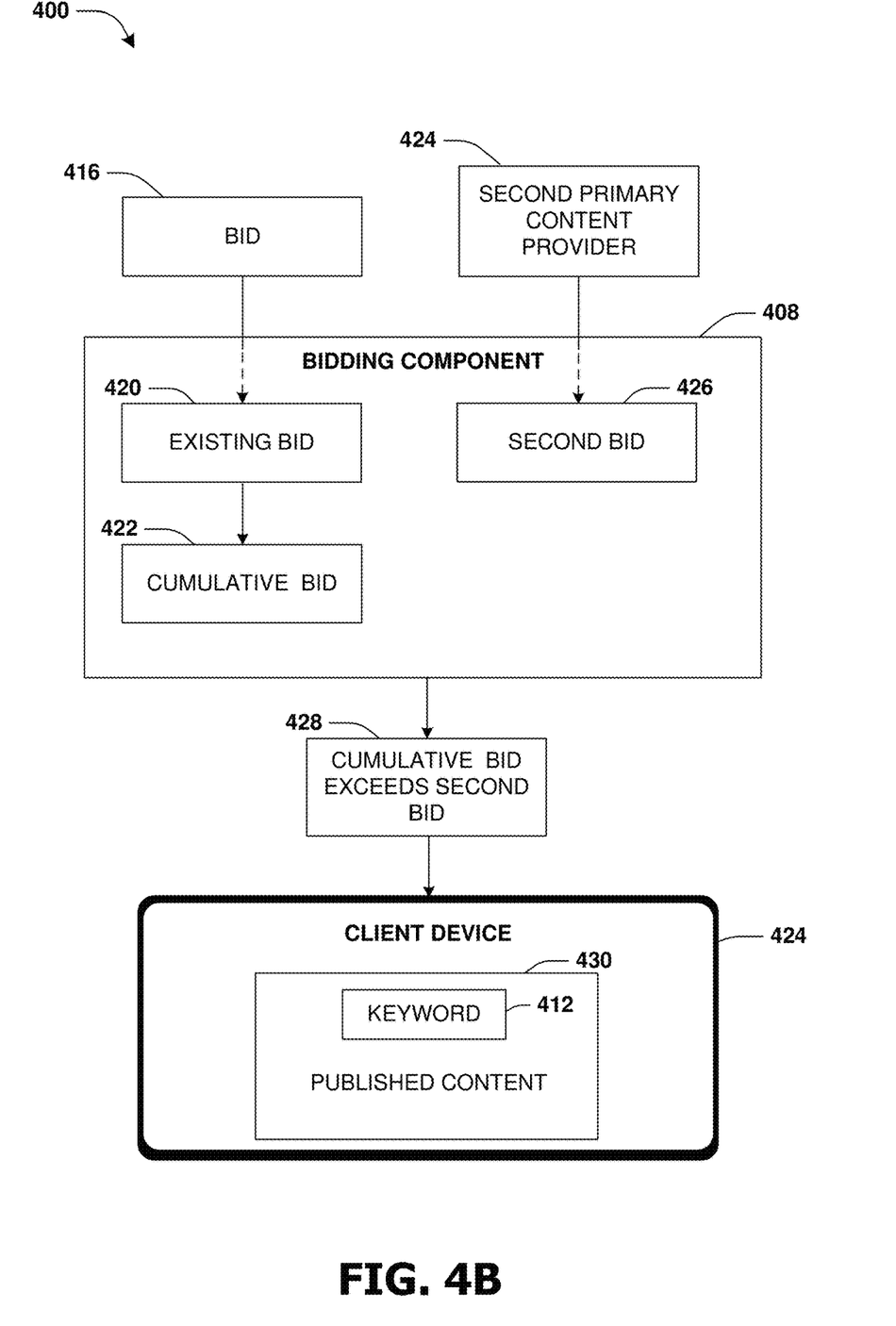
FIG. 4B is a component block diagram illustrating an example system for content identification, where non-published content is selected for presentation to a user.

FIGS. 4A-4B illustrate an example system 400 for selecting content utilizing a bidding component 408. A primary content provider 402 (e.g., a retail store), associated with a campaign 404 for a product 406 (e.g., Soccer apparel), may be identified. The campaign 404 may comprise non-published content 410 (e.g., video, images, audio, text, etc.), a keyword 412, an existing bid 420, targeting attributes (e.g., a domain, a topic group, an age group of users, a gender group of users, a category of users, etc.), negative targeting attributes (e.g., a negative domain, a negative topic, or a negative keyword, a negative age group of users, a negative gender group of users, a negative category of users, etc.), etc.

The campaign 404 may be provided to the bidding component 408. The primary content provider 402 may identify a permitted content provider 418. The permitted content provider 418 may comprise a content provider associated with the product 406. In an example, if the product 406 comprises a soccer jersey of Famous Soccer Player, then the permitted content provider 418 may comprise a first content provider that makes the soccer jersey, a second content provider may comprise the Famous Soccer Player, a third content provider may comprise a league in which the Famous Soccer Player plays, etc.

The bidding component 408 may provide the non-published content 410, the keyword 412, an option to bid 414 on the keyword 412, and/or an existing bid 420 for the keyword 412 to the permitted content provider 418. The permitted content provider 418 may utilize the option to bid 414 by generating a bid 416. The bid 416 may be received by the bidding component 408. The bid 416 may be combined with the existing bid 420 to determine a cumulative bid 422, as illustrated in FIG. 4B. The cumulative bid 422 may equal the existing bid 420 plus a sum of the bid 416 and/or bids from other permitted content providers (e.g., the first content provider, the second content provider, the third content provider, etc.). A second primary content provider 424 (e.g., a second retail store that sells soccer apparel) may generate a second bid 426 for the keyword 412 (e.g., soccer jersey). The second bid 426 may be received by the bidding component 408. Responsive to the cumulative bid 422 exceeding 428 the second bid 426, the non-published content 410 may be selected to be provided to the user, on a client device 424, searching for the keyword 412. Once provided to the user, the non-published content 410 may correspond to published content 430.

A non-permitted content provider, identified by the primary content provider 402, may provide a non-permitted bid to the primary content provider 402 for the campaign 404 comprising the keyword 412 and/or the published content 430. Responsive to the primary content provider 402 accepting the non-permitted bid, a non-permitted cumulative bid may be determined based upon the cumulative bid 422 from the primary content provider 402 and the permitted content provider 418 and/or the existing bid 420 from the primary content provider 402. In an example, the non-permitted content provider may be restricted from altering the keyword 412 and/or the published content 430. In this way, the non-permitted cumulative bid may be compared to other bids to determine what content to provide to the user.

Figure 5A:
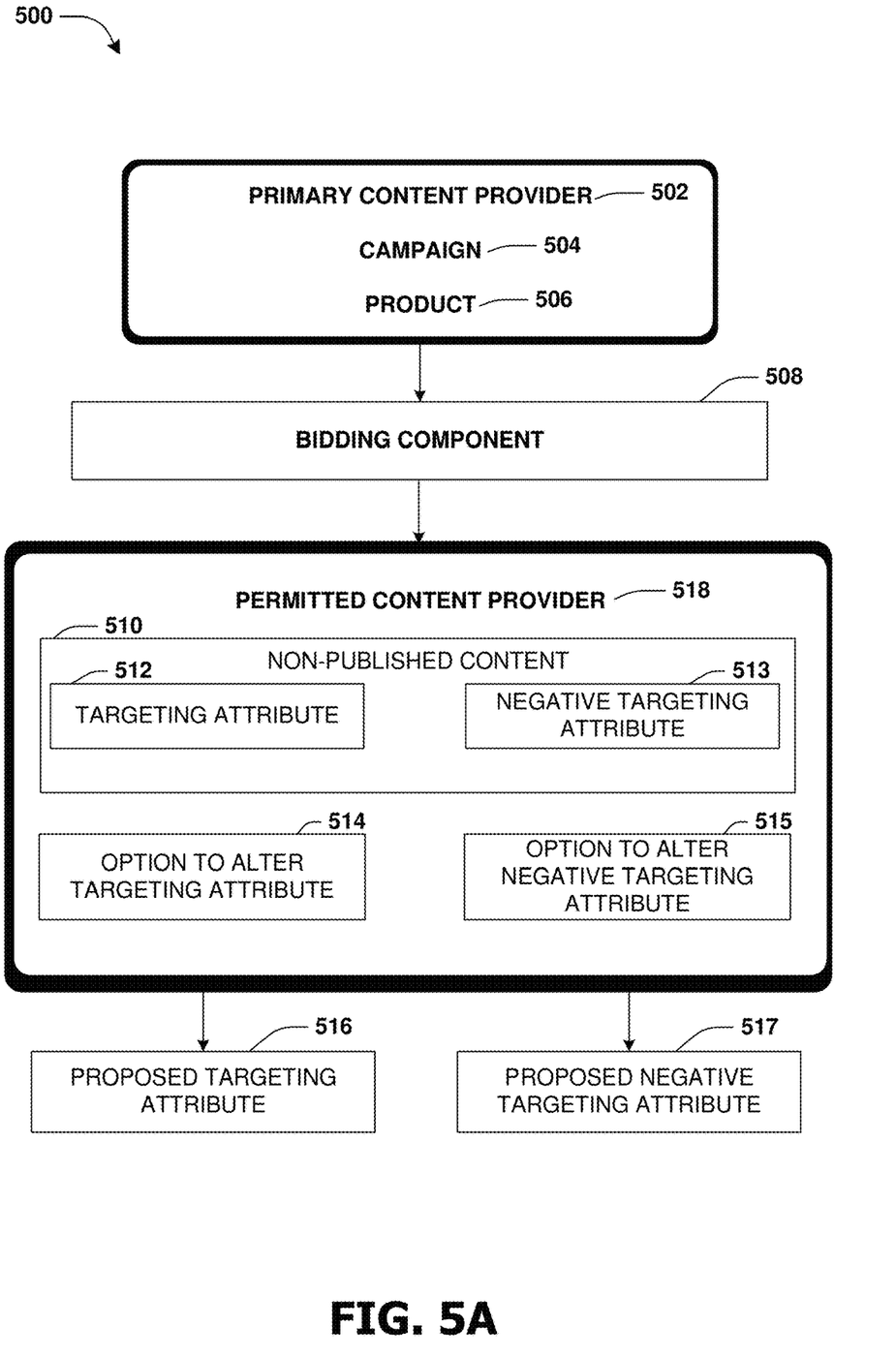
FIG. 5A is a component block diagram illustrating an example system for content identification, where at least one of a proposed targeting attribute or a proposed negative targeting attribute is generated.
Figure 5B:
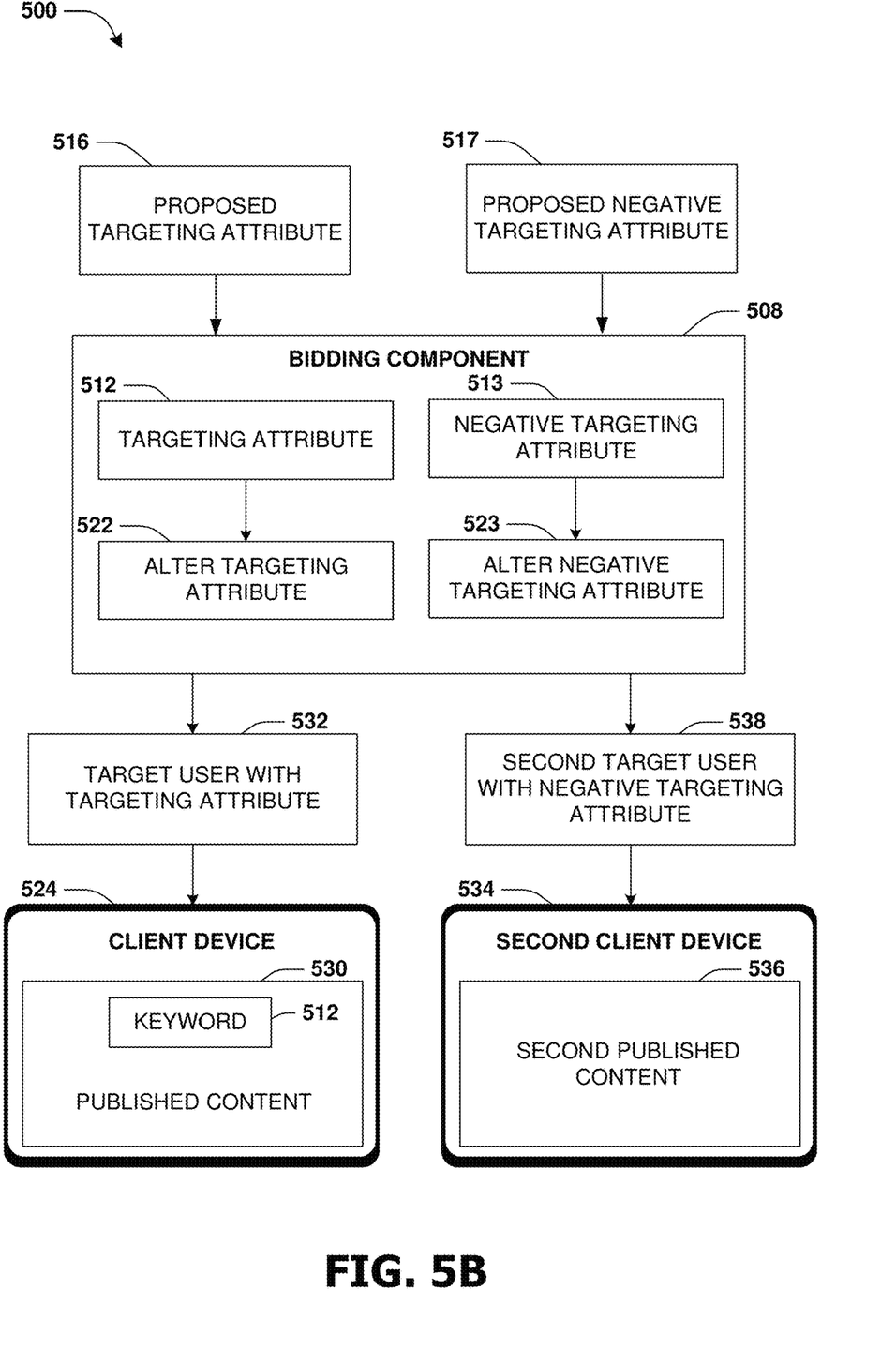
FIG. 5B is a component block diagram illustrating an example system for content identification, where non-published content is selected for presentation to a user corresponding to a targeting attribute and not selected for presentation to a second user corresponding to a negative targeting attribute.

FIGS. 5A-5B illustrate an example system 500 for selecting content utilizing a bidding component 508. A primary content provider 502 (e.g., a sporting goods store), associated with a campaign 504 for a product 506 (e.g., basketball shoes associated with a famous basketball player), may be identified. The campaign 504 may comprise non-published content 510, an existing bid (not shown), a keyword (not shown), a targeting attribute 512, a negative targeting attribute 513, etc. The campaign 504 may be provided to a permitted content provider 518. In an example, based upon the product 506 comprising Famous Basketball Player shoes associated with a Famous Basketball Player, the targeting attribute 512 may comprise targeting a group of users comprising adult males. Based upon the Famous Basketball Player having had a negative incident that involved alcohol, domains (e.g., websites) associated with alcohol may comprise the negative targeting attribute 513.

The bidding component 508 may provide the permitted content provider 518 with the non-published content 510, the targeting attribute 512, an option 514 to alter the targeting attribute 512, the negative targeting attribute 513, and/or an option 515 to alter the negative targeting attribute 513. The permitted content provider 518 may utilize the option 514 to alter the targeting attribute 512 by generating a proposed targeting attribute 516. The permitted content provider 518 may utilize the option 515 to alter the negative targeting attribute 513 by generating a proposed negative targeting attribute 517. The permitted content provider 518 may submit a bid for the keyword to the primary content provider 502 with the proposed targeting attribute 516 and/or the proposed negative targeting attribute 517.

FIG. 5B illustrates the example system 500 for selecting the non-published content 510, as illustrated in FIG. 5A, to be provided to the user having the proposed targeting attribute 516. The proposed targeting attribute 516 and/or the proposed negative targeting attribute 517 may be received by the bidding component 508. Responsive to the proposed targeting attribute 516 being approved by the primary content provider 502, as illustrated in FIG. 5A, the proposed targeting attribute 516 may be added to and/or used to replace the targeting attribute 512.

In an example, if the targeting attribute 512 comprises targeting females aged 8 years to 35 years, and the proposed targeting attribute 516 comprises targeting females aged 25 years to 40 years (e.g., the non-published content may be displayed during a television drama popular with women), then the proposed targeting attribute 516 may be added to the targeting attribute 512. Thus, the targeting attribute 512 may be altered 522 to comprise the proposed targeting attribute 516, such as females aged 8 years to 40 years.

In another example, if the negative targeting attribute 513 comprises domains marketing alcohol, and the proposed targeting attribute 516 comprises targeting domains marketing alcohol, then the proposed targeting attribute 516 may be rejected by the primary content provider 502 and the negative targeting attribute 513 may not be altered 523. The proposed targeting attribute 516 may be rejected by the primary content provider based upon the proposed targeting attribute 516 being in opposition to the negative targeting attribute 513. In an example, if the permitted content provider provides a large bid acceptable to the primary content provider, then the primary content provider may alter 523 the negative targeting attribute 513 and add the proposed targeting attribute 516 to the targeting attribute 512.

In another example, if the proposed negative targeting attribute 517 comprises boys ages 4 years to 18 years, and the negative targeting attribute 513 comprises children ages 4 years to 18 years (e.g., where the product comprises an item that has regulations prohibiting sale to minors), then the negative targeting attribute 513 may be altered 523 to comprise the proposed negative targeting attribute 517.

Responsive to the primary content provider 502 altering 522 the targeting attribute 512 to comprise the proposed targeting attribute 516, the non-published content 510 may be provided to a target user 532, having the targeting attribute 512 (e.g., a 37 year old women) on a client device 524, as published content 530. The published content 530 may be provided to the target user 532 responsive to the target user 532 searching for the keyword 512. Responsive to the primary content provider altering 523 the negative targeting attribute 513 to comprise the proposed negative targeting attribute 517, the non-published content 510 may not be provided to a second target user 538, having the proposed negative targeting attribute 517 (e.g., a 5 year old boy), on a second client device 534. The second target user 538 may be provided with second published content 536 from a second primary content provider.

A non-permitted content provider may provide a non-permitted bid to the primary content provider 502 for the campaign 504, as illustrated in FIG. 5A, comprising the keyword 512 and/or the published content 530 having the targeting attribute 512 and/or the negative targeting attribute 513. The non-permitted content provider may be provided with an option to alter the targeting attribute 512 and/or the negative targeting attribute 513, in the same manner as described above with regard to the permitted content provider 518.

Figure 6A:
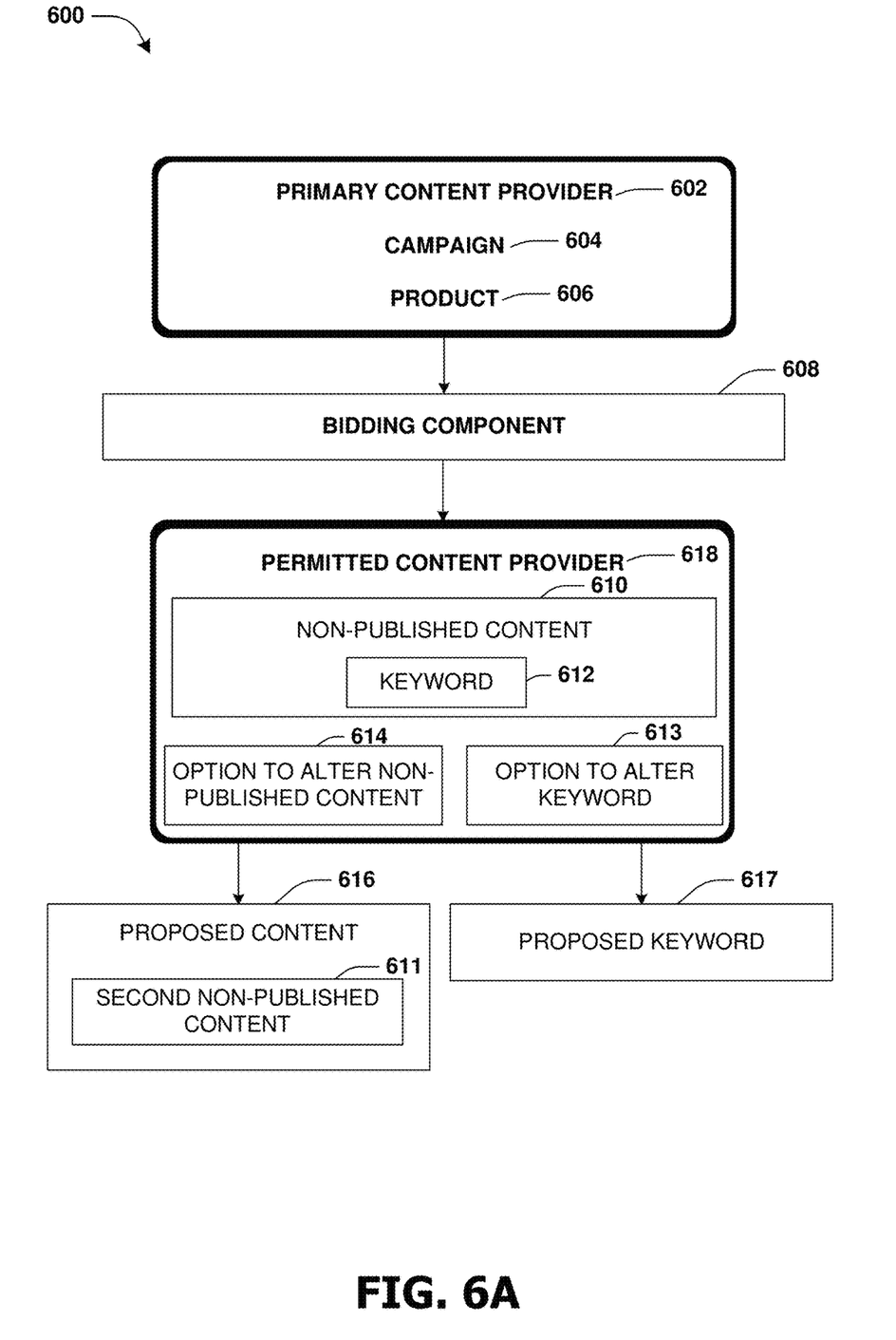
FIG. 6A is a component block diagram illustrating an example system for content identification, where at least one of proposed content or a proposed keyword is generated.
Figure 6B:
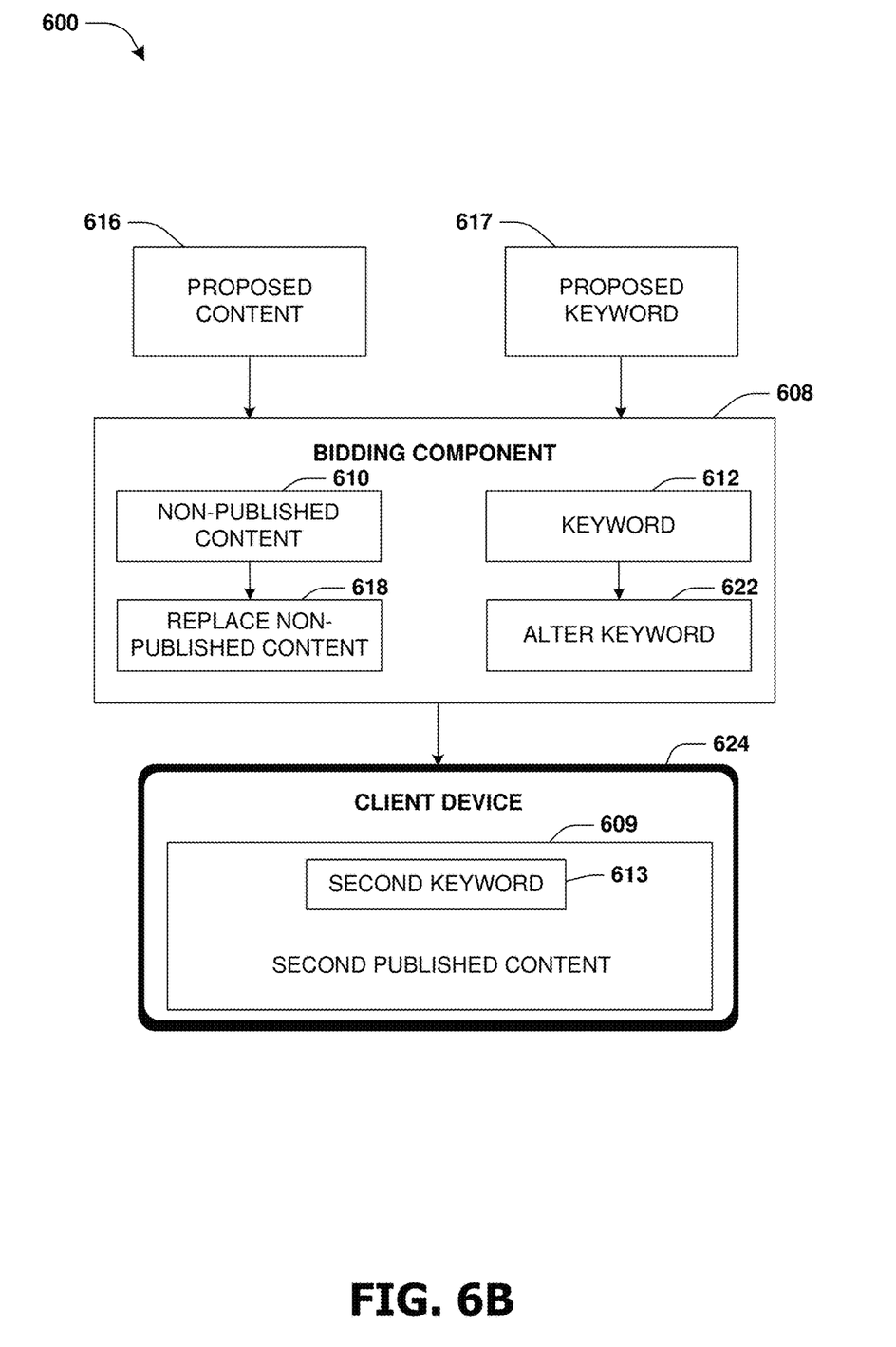
FIG. 6B is a component block diagram illustrating an example system for content identification, where published content is selected for presentation to a user based upon a second keyword.

FIGS. 6A-6B illustrate an example system 600 for selecting content utilizing a bidding component 608. A primary content provider 602 (e.g., a tractor supply store), associated with a campaign 604 for a product 606 (e.g., a tractor), may be identified. The campaign 604 may comprise non-published content 610, an existing bid (e.g., a monetary value), a keyword 612 (e.g., tractor, farming supply, etc.), etc. The campaign 604 may be provided to a permitted content provider 618.

The bidding component 608 may provide the non-published content 610, an option 614 to alter the non-published content 610, the keyword 612, an option 613 to alter the keyword 612, and the existing bid to the permitted content provider 618. The permitted content provider 618 may utilize the option 614 to alter the non-published content 610 by generating proposed content 616 (e.g., comprising second non-published content 611). The permitted content provider 618 may utilize the option 613 to alter the keyword 612 by generating a proposed keyword 617. The permitted content provider 618 may submit a bid to the primary content provider 502 with the proposed keyword 617 (e.g., farm tractor, farming tools, etc.) and/or the proposed content 616 (e.g., an advertisement for tractor oil).

FIG. 6B illustrates an example of selecting the non-published content for providing to a user. The proposed content 616, the proposed keyword 617, and/or the bid may be received by the bidding component 608. Responsive to the proposed content 616 being approved by the primary content provider 602, the non-published content 610 may be replaced 618 by the second non-published content 611. Responsive to the proposed keyword 617 being approved by the primary content provider 602, the keyword 612 may be replaced and/or altered 622 to comprise the proposed keyword 617. In an example, if the keyword 612 comprises the term "tractor" and the proposed keyword 617 comprises the term "farm tractor," then the keyword 612 may be altered 622 to comprise a second keyword 613 (e.g., "farm tractor"). In an example, if the keyword 612 comprises the term "farm supply" and the proposed keyword 617 comprises the term "tractor oil," then the keyword 612 may be replaced to comprise the second keyword 613 (e.g. "tractor oil"). The second keyword 613 and/or second published content 609 (e.g., comprising the second non-published content 611 having been published to a user) may be provided to the user on a client device 624.

A non-permitted content provider may provide a non-permitted bid to the primary content provider for the campaign comprising the second keyword 613 and/or the second published content 609. The non-permitted content provider may be restricted from altering the second keyword 613 or the second published content 609.

Figure 7:
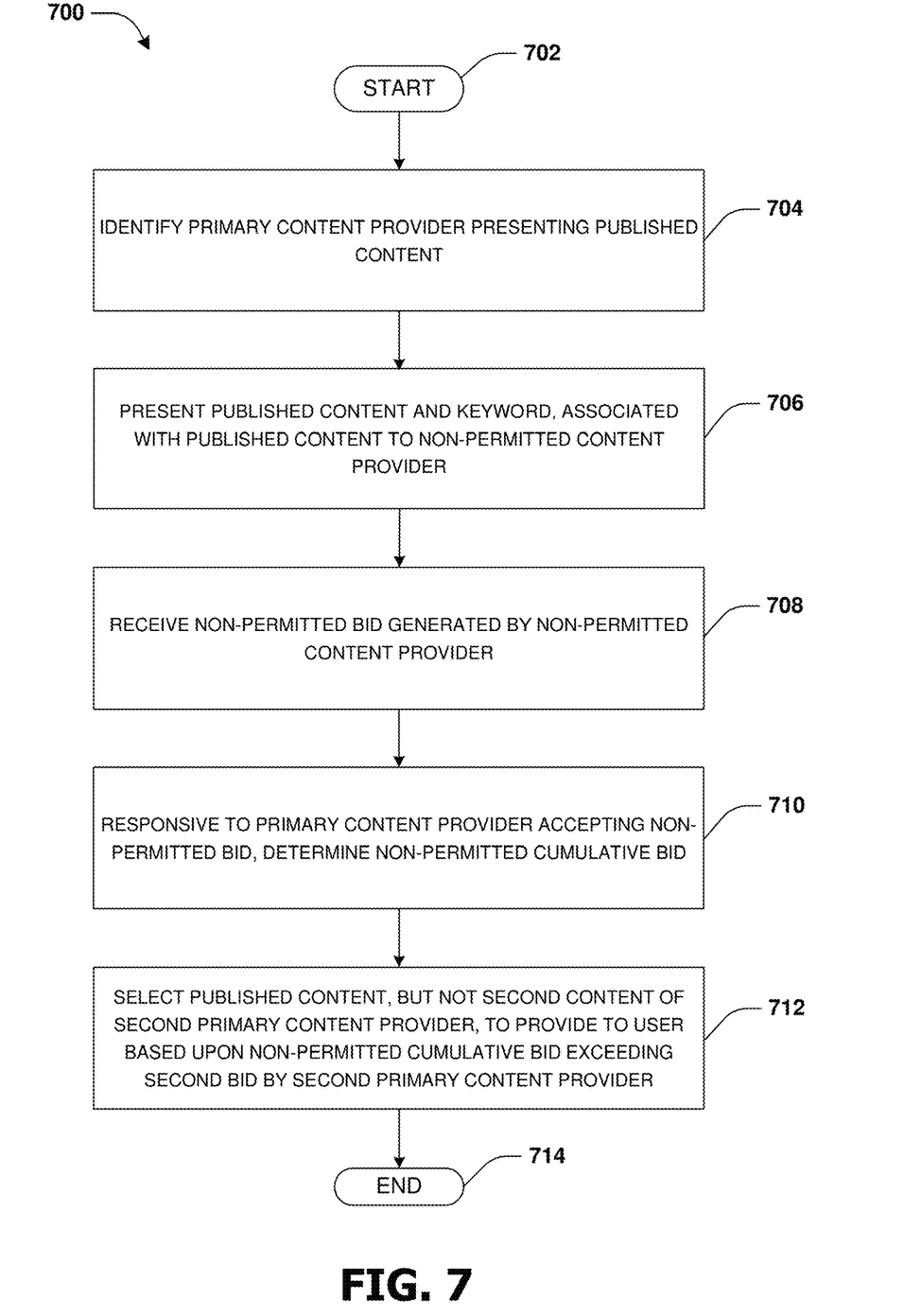
FIG. 7 is a flow chart illustrating an example method of content selection.

An embodiment of content selection is illustrated by an example method 700 of FIG. 7. At 702, the method 700 starts. At 704, a primary content provider, associated with a campaign (e.g., published content such as content associated with a product, a keyword associated with the product, etc.), may be identified. At 706, the published content and the keyword may be presented to a non-permitted content provider (e.g., the non-permitted content provider may be identified by the primary content provider). At 708, the primary content provider may receive a non-permitted bid from the non-permitted content provider. At 710, responsive to the primary content provider accepting the non-permitted bid, a non-permitted cumulative bid may be determined based upon at least one of a cumulative bid from a permitted content provider and the primary content provider, or an existing bid from the primary content provider. At 712, the published content, but not second content of a second primary content provider, may be selected to be provided to a user, based upon the non-permitted cumulative bid exceeding a second bid by the second primary content provider. At 712, the method 700 ends.

Figure 8:
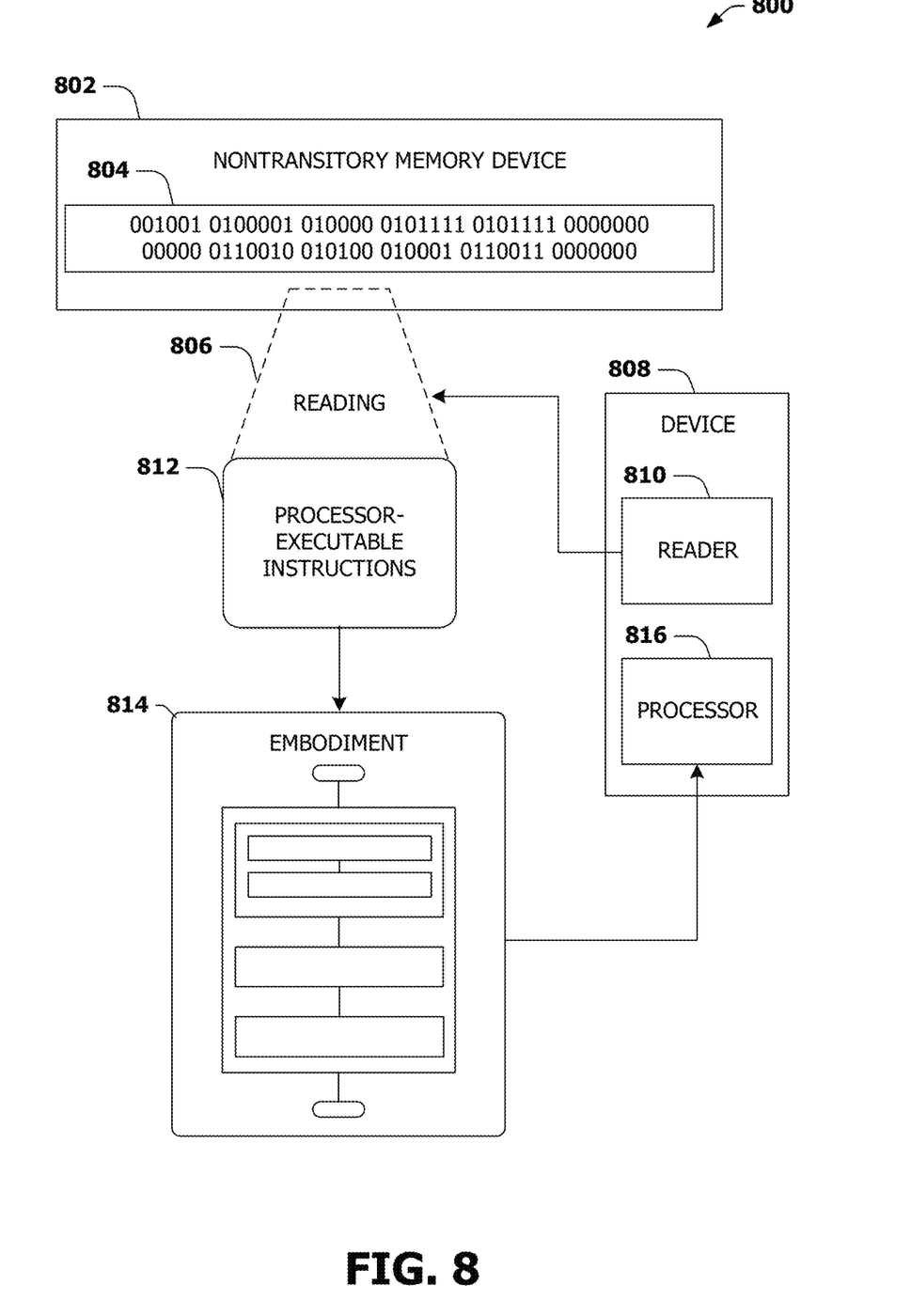
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example 700 of FIG. 7, for example. In some embodiments, the processor-executable instructions, when executed on the processor 816 of the device 808, are configured to implement a system, such as at least some of the example system 400 of FIGS. 4A-4B, at least some of the example system 500 of FIGS. 5A-5B, and/or at least some of the example system 600 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", with, and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for selecting content, comprising:
   a processor; and
   memory comprising processor-executable instructions that when executed by the processor cause implementation of a bidding component configured to:
   identify a primary content provider associated with non-published content comprised in a campaign for a product, the non-published content comprising content that has not been published;
   present the non-published content and a keyword associated with the non-published content to a permitted content provider identified by the primary content provider;
   present an option, to the permitted content provider, to provide a bid to purchase the keyword;
   receive the bid of the permitted content provider;

responsive to the primary content provider accepting the bid, determine a cumulative bid based upon the bid and an existing bid from the primary content provider;

present an option to alter a targeting attribute of the campaign to the permitted content provider in association with a collaboration between the primary content provider and the permitted content provider corresponding to the accepting of the bid of the permitted content provider by the primary content provider;

receive a proposed targeting attribute from the permitted content provider in response to the option to alter the targeting attribute of the campaign;

identify one or more negative targeting attributes, of the campaign, indicative of at least one of a negative domain, a negative topic, a negative keyword, a negative age group of users, a negative gender group of users or a negative category of users;

evaluate the proposed targeting attribute, using the one or more negative targeting attributes of the campaign, to determine whether the proposed targeting attribute is at least one of the one or more negative targeting attributes of the campaign;

responsive to determining that the proposed targeting attribute is in opposition to a negative targeting attribute of the one or more negative targeting attributes of the campaign, reject the proposed targeting attribute, wherein the negative targeting attribute of the campaign is not altered in association with the proposed targeting attribute based upon the rejection of the proposed targeting attribute; and control transmission of content, comprising the non-published content, to one or more devices associated with one or more users based upon attributes of the campaign.

2. The system of claim 1, the bidding component configured to:

receive a second bid from a second content provider;

present a second option to alter a second targeting attribute of the campaign to the second content provider;

receive a second proposed targeting attribute from the second content provider in response to the second option;

evaluate the second proposed targeting attribute, using the one or more negative targeting attributes of the campaign, to determine whether the second proposed targeting attribute is in opposition to at least one of the one or more negative targeting attributes of the campaign;

responsive to determining that the second proposed targeting attribute is in opposition to a second negative targeting attribute of the one or more negative targeting attributes of the campaign, determine whether the second bid by the second content provider exceeds a threshold bid defined by the primary content provider;

responsive to determining that the second bid exceeds the threshold bid, alter the second targeting attribute based upon the second proposed targeting attribute to generate an updated campaign; and control transmission of content to one or more devices associated with one or more users based upon attributes of the updated campaign.

3. The system of claim 1, wherein the one or more negative targeting attributes, of the campaign, are indicative of the negative domain, the negative topic, and the negative keyword.

4. The system of claim 1, wherein the one or more negative targeting attributes, of the campaign, are indicative of the negative age group of users, the negative gender group of users and the negative category of users.

5. The system of claim 1, the bidding component configured to:

present a second option to alter at least some content to the permitted content provider; and receive proposed content from the permitted content provider in response to the second option.

6. The system of claim 5, the bidding component configured to:

responsive to the primary content provider accepting the proposed content, alter the campaign to comprise the proposed content.

7. The system of claim 5, the bidding component configured to:

alter the non-published content to comprise the proposed content associated with the product.

8. The system of claim 1, the bidding component configured to:

present a second option to alter the keyword to the permitted content provider; and receive a proposed keyword from the permitted content provider in response to the second option.

9. The system of claim 8, the bidding component configured to:

responsive to the primary content provider accepting the proposed keyword, alter the keyword to comprise the proposed keyword.

10. The system of claim 1, the bidding component configured to:

present published content, corresponding to the non-published content having been published, and the keyword associated with the published content to a non-permitted content provider identified by the primary content provider;

present an option, to the non-permitted content provider, to provide a non-permitted bid to purchase the keyword;

receive the non-permitted bid by the non-permitted content provider; and responsive to the primary content provider accepting the non-permitted bid, determine a non-permitted cumulative bid based upon the non-permitted bid and the cumulative bid from the primary content provider and the permitted content provider.

11. The system of claim 1, the bidding component configured to:

present an option to alter the negative targeting attribute of the campaign to the permitted content provider; and receive a proposed negative targeting attribute from the permitted content provider in response to the option to alter the negative targeting attribute of the campaign.

12. The system of claim 11, the bidding component configured to:

responsive to the primary content provider accepting the proposed negative targeting attribute, alter the negative targeting attribute to comprise the proposed negative targeting attribute.

13. The system of claim 11, the bidding component configured to:

alter the negative targeting attribute to comprise at least one of a second negative domain, a second negative topic, or a second negative keyword.

14. A method for selecting content, comprising:
identifying a primary content provider associated with published content, comprising content that has been published, comprised in a campaign for a product;
presenting the published content and a keyword associated with the published content to a non-permitted content provider identified by the primary content provider;
presenting an option, to the non-permitted content provider, to provide a non-permitted bid to purchase the keyword;
receiving the non-permitted bid generated by the non-permitted content provider;
responsive to the primary content provider accepting the non-permitted bid, determining a non-permitted cumulative bid based upon the non-permitted bid and an existing bid from the primary content provider;
presenting an option to alter a targeting attribute of the campaign to the non-permitted content provider in association with a collaboration between the primary content provider and the non-permitted content provider corresponding to the accepting of the non-permitted bid of the non-permitted content provider by the primary content provider;
receiving a proposed targeting attribute from the non-permitted content provider in response to the option to alter the targeting attribute of the campaign;
identifying one or more negative targeting attributes, of the campaign, indicative of at least one of a negative domain, a negative topic, a negative keyword, a negative age group of users, a negative gender group of users or a negative category of users;
evaluating the proposed targeting attribute, using the one or more negative targeting attributes of the campaign, to determine whether the proposed targeting attribute is in opposition to at least one of the one or more negative targeting attributes of the campaign;
responsive to determining that the proposed targeting attribute is in opposition to a negative targeting attribute of the one or more negative targeting attributes of the campaign, rejecting the proposed targeting attribute; and
controlling transmission of content, comprising the published content, to one or more devices associated with one or more users based upon attributes of the campaign, wherein at least some of the method is implemented via a processor.

15. The method of claim 14, comprising:
presenting non-published content, comprising the content, and the keyword associated with the non-published content to a permitted content provider identified by the primary content provider;
presenting an option, to the permitted content provider, to provide a bid to purchase the keyword;
receiving the bid by the permitted content provider;
responsive to the primary content provider accepting the bid, determining a cumulative bid based upon the bid and the existing bid from the primary content provider; and
selecting the non-published content, but not second content of a second primary content provider, to provide to a user based upon the cumulative bid exceeding a second bid by the second primary content provider.

16. The method of claim 14, wherein the rejecting the proposed targeting attribute is performed responsive to determining that the non-permitted bid by the non-permitted content provider is less than a threshold bid defined by the primary content provider.

17. The method of claim 15, comprising:
presenting a second option to alter the non-published content to the permitted content provider;
receiving proposed content from the permitted content provider in response to the second option; and
responsive to the primary content provider accepting the proposed content, altering the non-published content to comprise the proposed content, the altering comprising altering the content to comprise a third content.

18. The method of claim 15, comprising:
presenting a second option to alter the keyword, by generating a proposed keyword, to the permitted content provider;
receiving the proposed keyword from the permitted content provider in response to the second option; and
responsive to the primary content provider accepting the proposed keyword, altering the keyword to comprise the proposed keyword.

19. The method of claim 14, comprising:
receiving a second bid from a second content provider;
presenting a second option to alter a second targeting attribute of the campaign to the second content provider;
receiving a second proposed targeting attribute from the second content provider in response to the second option;
responsive to determining that the second proposed targeting attribute is associated with the negative targeting attribute of the campaign, determining whether the second bid by the second content provider exceeds a threshold bid defined by the primary content provider; and
responsive to determining that the second bid exceeds the threshold bid, altering the second targeting attribute based upon the second proposed targeting attribute.

20. A system for selecting content, comprising:
a processor; and
memory comprising processor-executable instructions that when executed by the processor cause implementation of a bidding component configured to:
identify a primary content provider associated with content comprised in a campaign for a product;
present the content and a keyword associated with the content to a permitted content provider identified by the primary content provider;
present an option, to the permitted content provider, to provide a bid to purchase the keyword;
receive the bid of the permitted content provider;
responsive to the primary content provider accepting the bid, determine a cumulative bid based upon the bid and an existing bid from the primary content provider;
present an option to alter a targeting attribute of the campaign to the permitted content provider in association with a collaboration between the primary content provider and the permitted content provider corresponding to the accepting of the bid of the permitted content provider by the primary content provider;
receive a proposed targeting attribute from the permitted content provider in response to the option to alter the targeting attribute of the campaign;
identify one or more negative targeting attributes, of the campaign, indicative of at least one of a negative domain, a negative topic, a negative keyword, a negative age group of users, a negative gender group of users or a negative category of users;

evaluate the proposed targeting attribute, using the one or more negative targeting attributes of the campaign, to determine whether the proposed targeting attribute is in opposition to at least one of the one or more negative targeting attributes of the campaign;

responsive to determining that the proposed targeting attribute is in opposition to a negative targeting attribute of the one or more negative targeting attributes of the campaign, reject the proposed targeting attribute;

control transmission of the content to one or more devices associated with one or more users based upon attributes of the campaign;

receive a second bid from a second content provider;

present a second option to alter a second targeting attribute of the campaign to the second content provider;

receive a second proposed targeting attribute from the second content provider in response to the second option;

evaluate the second proposed targeting attribute, using the one or more negative targeting attributes of the campaign, to determine whether the second proposed targeting attribute is in opposition to at least one of the one or more negative targeting attributes of the campaign;

responsive to determining that the second proposed targeting attribute is in opposition to a second negative targeting attribute of the one or more negative targeting attributes of the campaign, determine whether the second bid by the second content provider exceeds a threshold bid defined by the primary content provider;

responsive to determining that the second bid exceeds the threshold bid, alter the second targeting attribute based upon the second proposed targeting attribute to generate an updated campaign; and control transmission of second content to one or more second devices associated with one or more second users based upon attributes of the updated campaign.

* * * * *